Oct. 20, 1931.  C. H. RANKIN  1,828,443
APPARATUS FOR FEEDING MOLTEN GLASS
Filed Nov. 14, 1923  4 Sheets-Sheet 1

FIG.1.

WITNESS
J. Herbert Bradley.

INVENTOR
Carl H. Rankin
By Green and McCallister
His Attorneys

Oct. 20, 1931. C. H. RANKIN 1,828,443
APPARATUS FOR FEEDING MOLTEN GLASS
Filed Nov. 14, 1923 4 Sheets-Sheet 2

FIG.2.

WITNESS
J. Herbert Bradley.

INVENTOR
Carl H. Rankin
By Green and McCallister
His Attorneys

Oct. 20, 1931.   C. H. RANKIN   1,828,443
APPARATUS FOR FEEDING MOLTEN GLASS
Filed Nov. 14, 1923   4 Sheets-Sheet 3

WITNESS
J. Herbert Bradley.

INVENTOR
Carl H. Rankin
By Green and McAllister
His Attorneys

Patented Oct. 20, 1931

1,828,443

UNITED STATES PATENT OFFICE

CARL H. RANKIN, OF WELLSBURG, WEST VIRGINIA, ASSIGNOR, BY MESNE ASSIGNMENTS, TO HARTFORD-EMPIRE COMPANY, OF HARTFORD, CONNECTICUT, A CORPORATION OF DELAWARE

APPARATUS FOR FEEDING MOLTEN GLASS

Application filed November 14, 1923. Serial No. 674,604.

This invention relates to glass-feeding apparatus and particularly to a new and improved apparatus for and method of feeding molten glass in the form of gobs or measured mold charges.

An object of this invention is to provide a glass-feeding apparatus in which means are employed for insuring the delivery of gobs or mold charges in which each charge, at the time of its delivery from the apparatus, is homogeneous from the standpoint of the viscosity of the molten glass of which it is formed.

It is well known that there is a tendency for glass to become chilled as it passes from the melting tank to the forehearth or extension forming a part of the feeding apparatus. There is also a tendency for the glass at the extreme end of the forehearth to cool more rapidly than that closer to the tank. This is accentuated by the fact that in most feeders a portion at least of this glass is in a state of rest and under such conditions is more susceptible to rapid cooling. The result is that the glass delivered from the forehearth in the form of gobs is not homogeneous from the standpoint of temperature distribution, and this lack of uniformity of temperature is so pronounced in some of the gobs that they are chilled on one side to such an extent as to render them objectionable as mold charges. Then, too, the variations in the temperature of the glass in the forehearth causes successive gobs fed by the apparatus to vary materially in temperature and in heat distribution, with the result that the finished ware lacks uniformity.

An object of the invention is, therefore, to produce means for maintaining the molten glass from which the mold charges are delivered at a substantially uniform temperature and for also maintaining a uniform heat distribution throughout this glass.

A further object is to produce a new and improved method of forming gobs or mold charges in which the successive gobs or mold charges are maintained at a substantially uniform temperature and in which each gob is substantially homogeneous from the standpoint of heat distribution.

These and other objects which will be made more apparent throughout the further description of the invention are attained by means of apparatus embodying the features herein described and illustrated, and by means of the method of procedure herein set forth.

In the drawings accompanying and forming a part hereof.

The apparatus employed as an embodiment of the present invention includes a rotatable forehearth or receptacle 10 from which molten glass is delivered in the operation of forming measured masses or mold charges. As illustrated, the floor of the receptacle is provided with an orifice 11 through which the molten glass is delivered in the form of suspended gobs or mold charges. The flow through this orifice is controlled by a reciprocable plunger 12 and a co-operating sleeve 13 which surrounds the plunger and co-operates therewith in controlling the flow through the orifice. The orifice 11 is located at the center of revolution of the receptacle 10 and the plunger 12 and the sleeve 13 are axially aligned therewith and are both rotatable so that they are capable of rotating with the receptacle 10. A shear or cutting device is located below the orifice, and as is usual operates in timed relation with the plunger.

Figure 1:
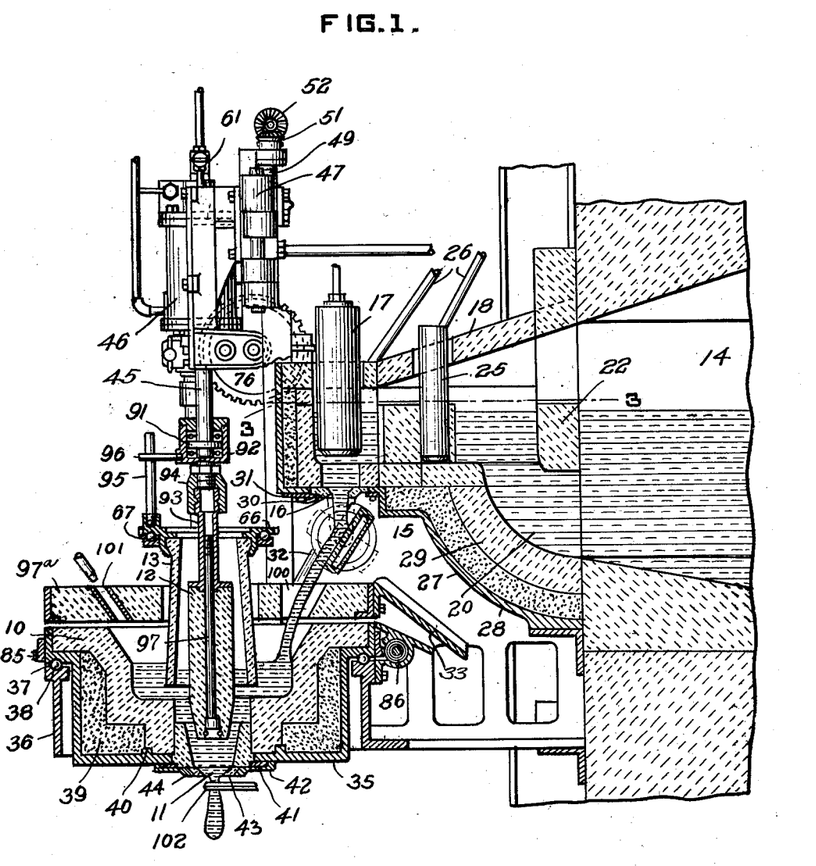
Figure 1 is a transverse sectional view along the line I—I of Figs. 2 and 3, and illustrates apparatus embodying my invention.
Figure 3:
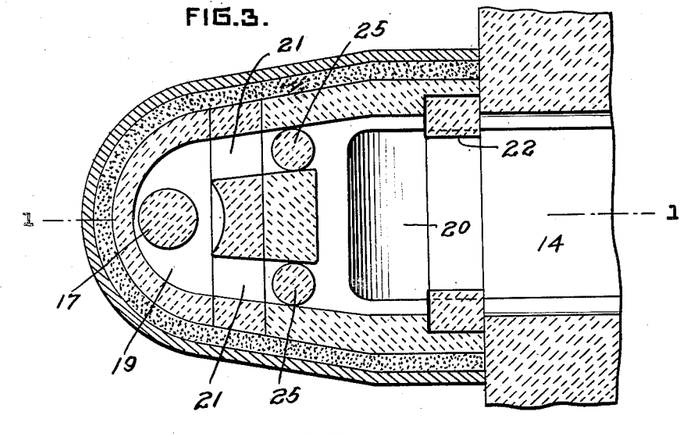
Fig. 3 is a fragmental plan view along the line III—III of Fig. 1.

Molten glass is delivered to the receptacle 10 from a furnace or melting tank 14 through a furnace extension generally illustrated at 15 in Fig. 1. As shown, the furnace 14 is of the usual construction but the extension is so constructed and arranged as to insure the delivery of molten glass free from impurities and of substantially uniform temperature. As shown in Fig. 1, the furnace extension overhangs the receptacle 10 and is provided with a glass-delivery orifice 16 through which a measured flow of glass is delivered to the receptacle 10. While the orifice 16 is shown in the floor of the extension, it may be located in any wall thereof in such a position as to be normally submerged by the molten glass contained within the extension. As shown, the orifice is controlled by an adjustable gate or valve 17 which is aligned with the orifice and projects downwardly through the cover 18, of the extension, into the molten glass contained within the extension. As shown in Fig. 3, the extension terminates in an elliptical passage or chamber 19 with which the orifice 16 is in direct communication. Molten glass from the furnace is fed to this passage through an upwardly extending and fully submerged passage 20 and two passages 21 which communicate with opposite ends of the chamber 19, and are symmetrically located with relation to the orifice 16. The upwardly extending passage 20 is formed between the floor of the extension and a partially submerged arch or barrier 22 which extends across the entrance to the extension 15, thereby performing the function of a skimmer ring and insuring that glass delivered through the orifice 16 is received from the tank at a predetermined level below the surface of the glass contained therein. As shown, the intake end of the passage 20 is located adjacent to the floor of the tank.

With this arrangement the glass delivered to the extension is more uniform, both as to quality and temperature than would be the case if glass from or near the surface of the tank were permitted to flow into the extension; and, in addition, the glass so delivered is freer from impurities since it is well known that most impurities contained in molten glass float to the surface of the glass contained within the melting tank or furnace.

Each of the passages 21 is provided with a gate or plug 25 which projects downwardly through the cover 18 and into the glass located within the passage. These gates are adjustable longitudinally or toward and away from the floor of the passages, for the purpose of controlling the flow through the passages and also for the purpose of cutting off the delivery of glass to the delivery end of the extension when this is desired.

Any suitable means may be employed for supporting the extension from the tank and in Fig. 1, I have shown stay-rods 26 as broken away but as adapted to be secured to the frame of the tank, and which form a support for the extension. I have also disclosed the extension as enclosed within a metallic casing 27 and as provided with an insulating jacket 28 and a clay or vitrous lining 29.

Any suitable and well-known means may be employed for raising and lowering the gates 17 and 25 and for supporting them in adjusted positions. The principal function of the gate 17 is to control the flow through the orifice 16, consequently, it must be adapted to be raised and lowered to different positions above the orifice and to be held in the adjusted position for the purpose of maintaining the adjusted flow. Well-known means may be employed for accomplishing this adjustment automatically; for example, a float supported by the molten glass in the tank or in the elliptical chamber 19 may be employed. With such an apparatus, the float is attached to the operating lever of the valve 17 in such a way that as the level of the glass rises in the tank, the valve 17 moves down to restrict the passage through the orifice 16 and in this way compensates for variations in the head of glass above the orifice.

The orifice 16 is provided with a removable orifice bushing 30 which is held in place by means of clamp fingers 31 removably bolted or otherwise secured to the bottom face of the metallic casing 27. With this arrangement, the orifice ring may be replaced by merely releasing the clamping fingers and consequently, the normal flow through the orifice may be readily and quickly varied by changing the size of the orifice bushing or in other words, by changing the effective size of the orifice.

Figure 5:
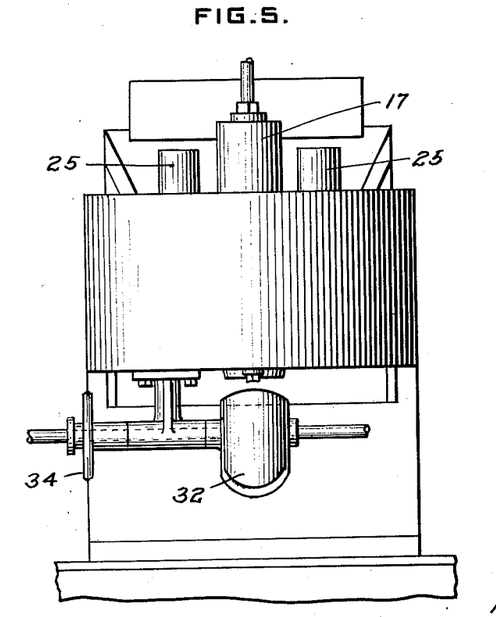
Fig. 5 is a front elevation of the apparatus shown in Fig. 3.

In the drawings, I have disclosed a tiltable chute 32 for directing the flow through the orifice either into the receptacle 10 or onto a chute 33. Any suitable means may be employed for cooling the chute 32 but in the drawings I have illustrated it as provided with a water-cooling passage through which a flow of cooling water is directed in the usual way. As shown in Fig. 5, the chute 32 is mounted on a shaft which is supported in suitable bearings and is provided at one end with a hand wheel 34 for turning it to one position or the other. It will, of course, be understood by those skilled in the art that with some settings of the forehearth or receptacle 10 the chute 33 will be unnecessary except for directing the flow of glass away from the forehearth.

The forehearth or receptacle 10 includes a metallic casing 35 which is substantially circular in cross section and is mounted for rotation on an annular bearing 36 carried by a frame or support which may be secured to the framework of the tank. As illustrated, the casing 35 is provided with an annular shoulder 37 which overhangs a ring 36 and is mounted thereon through the intermediary of ball bearings. The casing 35 is lined with a clay or vitrous lining which is lagged by a heat-insulating jacket 39 located between it and the metal casing. The vitrous lining is annular and is centered within the casing by means of an annular centering lug 40 formed on the metal casing, and the annular top edge of the casing. The bottom of the lining is provided with a circular opening in which an orifice ring 41 is located. This ring is held in place by means of an annular bracket 42 which is removably secured to the bottom face of the casing 35 by screws or bolts. The arrangement of the ring 41 and its supporting bracket is such that it may be removed through the bottom of the casing. The orifice 11 is surrounded by an orifice bushing 43 which bears against the bottom of the ring 41 and is held in place by means of an annular bracket 44 which is removably secured to the bottom face of the casing 35. The outer peripheral surface of this bushing is tapered from the ring 41 downwardly and the bracket 44 is provided with a complementary surface engaging the tapered face of the bushing. With this arrangement, the bracket 44 and the bushing 43 may be readily removed when it is desired to change orifice bushings.

The ring 41 forms a well in the bottom of the receptacle into which the plunger 12 moves during the operation of delivering gobs of glass through the orifice 11. As illustrated, the plunger is operatively connected to a piston rod 45, the piston of which operates within a cylinder 46 mounted on a hinged support 47. The support 47 is carried by standards 48 which may be secured to the supporting frame of the forehearth. Compressed air or other motive fluid is delivered to the cylinder in the usual manner, and in such a way as to produce the desired reciprocation of the plunger 12.

The cylinder is capable of adjustment toward and away from the forehearth 10 for the purpose of varying the range of plunger movement within the receptacle 10. This is accomplished by so mounting the cylinder on the cross support 47 that it may be quickly and readily adjusted to different vertical positions. In the apparatus illustrated, a nut, not shown, is provided on the rear side of the cylinder and is preferably rigidly secured thereto, and so arranged that it operates in a vertical guide formed on the cross support 47. The nut is engaged by a screw 49 which is rotated manually for the purpose of raising and lowering the cylinder. As shown, the screw 49 is journaled in bearings carried by the cross support and is provided at its upper end with a beveled gear 51 which meshes with a beveled gear 52 mounted on a shaft 53.

The shaft is mounted in bearings carried by the cross support 47 and overhangs its bearings, being provided near its outer end with a beveled gear 54 which is rigidly secured to it and forms a stop for a bracket 55 loosely mounted on the shaft. The bracket 55 supports a beveled gear 56, which meshes with the gear 54, and is adapted to turn that gear in the operation of adjusting the position of the cylinder 46. As shown, a hand wheel 57 and stem 58 are operatively coupled to the gear 56 and are so arranged that the hand wheel is located at a position convenient for the operator of the apparatus and may be swung to different positions around the pivotal point of the bracket 55. The shaft 53 is also provided with a crank 59 which may be used for adjusting the position of the cylinder 46.

For the purpose of varying the throw of the plunger 12 during its reciprocations, I have provided an adjustable, calibrated sleeve 61 which surrounds an extension of the piston rod 45 projecting through the upper head of the cylinder 46. This sleeve is adjustable to different longitudinal positions and is adapted to engage a collar or nut 62 formed on the extension for the purpose of limiting the downward movement of the piston, and consequently of the plunger 12. As shown, the sleeve 61 projects into a split sleeve or bushing 63 rigidly secured to the upper head of the cylinder 46 and which is adapted to clamp the sleeve 61 in adjusted positions. The bushing 63 is provided with spaced wings which are arranged to be drawn together by means of a hand screw 64, in the operation of clamping the sleeves 61 in the desired position. A valve 65 is provided in the top of a cylinder to relieve pressure or vacuum when it is necessary to adjust the position of the piston rod 45.

The sleeve 13, which surrounds the plunger 12 and which, like the plunger, projects downwardly into the molten glass contained in the receptacle 10, is so mounted that it is capable of being adjusted to different positions toward and away from the orifice 11 and in this way proportions the rate of flow of glass to the well located above the orifice 11. Both the sleeve 13 and the plunger 12 are so mounted that they are capable of rotating with the receptacle 10.

As shown, the sleeve is formed of clay or vitrous material, and is slightly tapered so that it is of larger diameter at the bottom than at the top. A metal cap 66 is suitably secured to the top of the sleeve and is provided with an outwardly projecting annular flange which is mounted by means of ball bearings on a plate 67. The plate is supported by two vertically extending rods 68 which are mounted in guides or ways 69 more clearly shown in Fig. 6. These ways are rigidly secured to the swinging support 47 and are so arranged that the rods mounted in them may be moved to different vertical positions during the operation of adjusting the position of the sleeve 13.

Figures 4, 6, 7, 8:
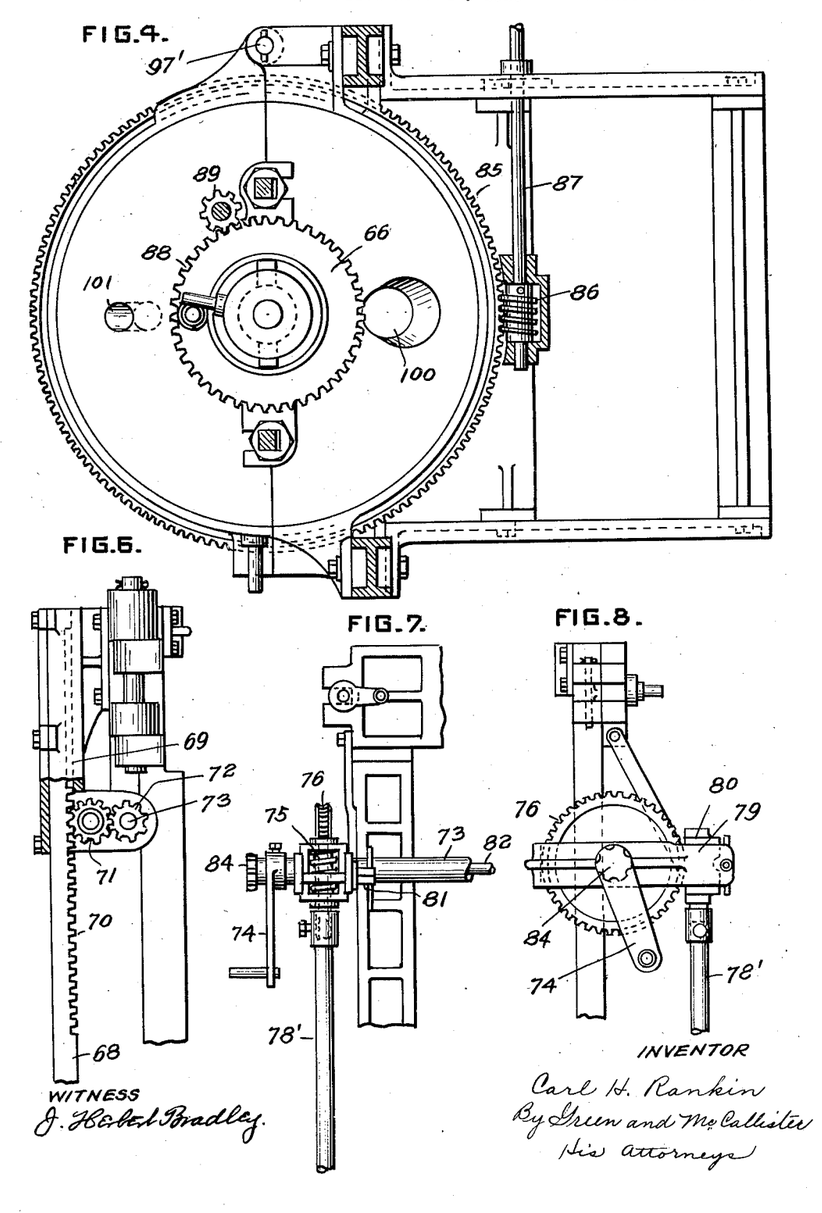
Fig. 4 is a plan view of a portion of the apparatus shown in Fig. 1.
Fig. 6 is a side elevation, portions being shown in section, of an adjusting device forming a detail of my invention.
Fig. 7 is a front elevation further illustrating the device illustrated in Fig. 6.
Fig. 8 is a side elevation of the apparatus shown in Fig. 7.

As shown in Fig. 6, the upper portion of each rod 68 is so formed as to provide a rack 70 which is engaged by a pinion 71 for the purpose of raising and lowering the rods. The pinion 71 is shown as an idler and is journaled on a trunnion carried by a projection of the way 69. This pinion meshes with a pinion 72 mounted on a shaft 73 which is journaled in bearings carried by both of the guides 69 and which extends substantially at right angles to both the rods 68. This shaft is provided with two of the gears 72, each adapted to move one of the rods 68 through the agency of an idler gear 71. An adjusting handle 74 is provided on the shaft 73 for turning the shaft and thereby raising and lowering the sleeve 13.

The operation of adjusting the sleeve 13 to various operating positions during the operation of the feeder is accomplished by means of a worm 75 and a worm wheel 76. The worm wheel is rigidly mounted on the shaft 73 and the worm is journaled in a housing 77 which may be wholly or partially supported by the shaft 73. It is also operatively connected to a hand wheel 78 by means of a stem 78'. With this arrangement the hand wheel may be swung to various positions convenient to the hand of the operator during the operation of adjusting the position of the sleeve.

When it is necessary to raise the sleeve out of the receptacle or forehearth 10, the worm 75 may be moved out of mesh with the worm wheel 76 and the handle 74 may then be employed. For this reason the worm is mounted in a slidable bearing 80 carried by the housing 77. This bearing is capable of being held in place, with the worm in mesh with the worm wheel 76 by an ordinary clamping device which is actuated by the hand screw 81.

Means are provided for holding the sleeve 13 in an elevated position when the worm is out of mesh with the worm wheel 76. As shown, the shaft 73 is hollow and a rod 82 projects through it. This rod is provided at the crank end of the shaft with a nut 84 and is provided at the other end with a collar 85' (see Fig. 2), which is located beyond the shaft and is of sufficient diameter to engage the end of the adjacent shaft bearing. When the nut 84 is screwed up, the collar 85' is drawn into gripping engagement with the end of the bearing and the shaft 73 is clamped between it and the nut 84 with sufficient force to hold the sleeve 13 in a elevated position.

Figure 2:
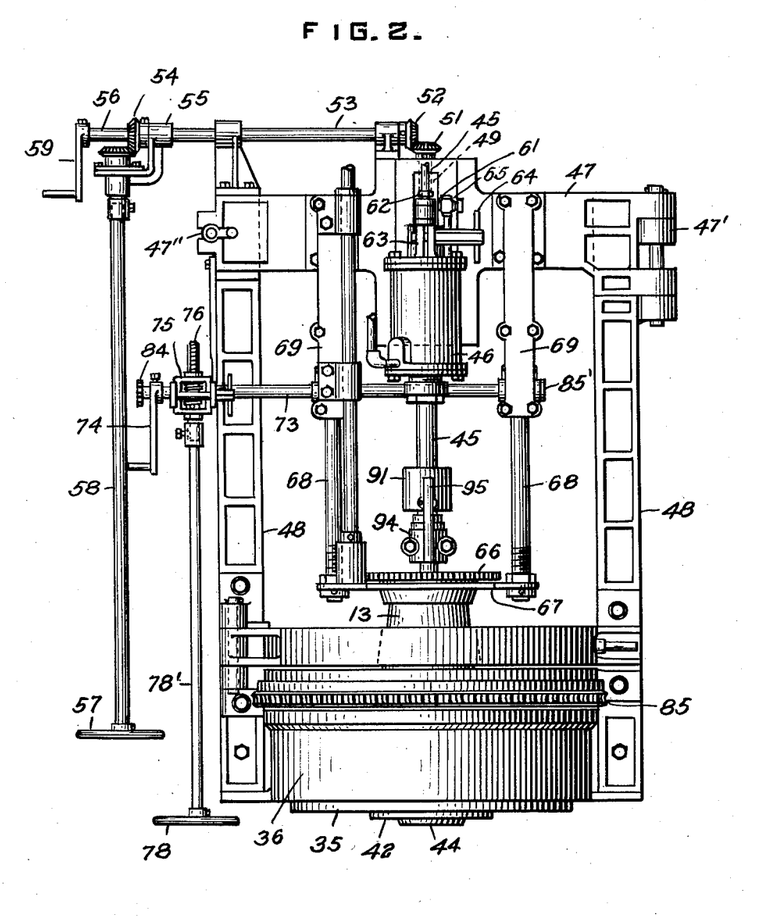
Fig. 2 is a front elevation of the apparatus shown in Fig. 1.

One of the important features of the invention is that the receptacle or forehearth 10 is rotated during the operation of feeding mold charges. As has been described, the forehearth is rotatably mounted on the support 36. It is also provided with a worm gear 85 which surrounds it and which is driven by a worm 86 as is clearly shown in Fig. 4. The worm is mounted on a shaft 87 which is journaled in suitable bearings provided on the forehearth support and which is preferably driven by a variable speed motor, not shown. The sleeve 13 is also rotatably mounted and, as shown, in Figs. 2 and 4, is provided with driving gears 88 and 89. The gear 88 may be integrally formed with the cap 66 and the gear 89 may be mounted on a shaft which is geared to the shaft 87 or otherwise so driven as to rotate the sleeve 13 at the same angular velocity as the forehearth. This gear 89 is, of necessity, elongated so as to remain in mesh with the gear 88 for the different positions of the sleeve 13.

The plunger 12 is rotated with the sleeve 13 by the gear 88.

As shown in Fig. 1, the piston rod 45 is provided at its lower end with a collar 91 which is enclosed within a ball bearing housing 92. Two ball bearings are included in the housing, one being located on each side of the collar so as to form thrust bearings. The plunger 13 is mounted on a stem 93 which is rigidly secured to the housing 92 by means of a connection 94 which is screwed onto a boss carried by the housing 92. Motion is imparted to the housing and consequently to the plunger 12 by means of a vertical post 95 mounted in a suitable boss carried by the plate or gear 66 and engaging a horizontally extending finger 96 mounted in a suitable boss carried by the bushing 92.

The plunger 12 is formed essentially of clay or vitrous material but, as illustrated, is reinforced by a heat resisting metal rod 97. As shown, the rod 97 projects upwardly through the clay portion of the plunger and is screwed into the metal stem 93. The lower end of the rod is provided with a collar which seats on a shoulder formed within the plunger. The lower end of the recess through which the rod is inserted through the plunger is sealed by fireclay after the rod is in place.

In order to prevent undue radiation of heat from the glass contained within the receptacle 10, I have provided a cover 97a for that receptacle. As shown, the cover is formed in two parts, one of which is mounted on the supporting frame of the receptacle and the other of which is secured thereto by means of a hinge 97' and is capable of being swung outwardly for the purpose of exposing the interior of the receptacle. As shown, the line of division between the separate parts of the cover is a longer diameter passing through the axis of the rotating receptacle and each portion of the cover is recessed to receive the sleeve 13. The stationary portion of the cover is provided with an aperture 100, through which molten glass is delivered from the orifice 16 of the extension 15 to the interior of the receptacle. I have shown a burner opening 101 formed in the hinged portion of the cover 97 through which a jet of flame may be projected into the interior of the receptacle for the purpose of heating the glass contained therein and also the portions of the feeder contained within the receptacle.

The support 47 is hinged so that the parts supported by it may be moved out of the way when it is necessary to gain access to the interior of the receptacle 10. This arrangement also makes it easier to mount the plunger 12 and the sleeve 13 on their respective supporting elements, and also facilitates some of the adjustments. As shown, the support 47 is hinged to one upright 48 by means of hinge 47′ and is capable of being rigidly locked in normal operating position by means of a lock 47″ carried by other upright 48. A plunger supporting and actuating mechanism having a hinged support also is disclosed but is not specifically claimed in my prior application, Serial No. 342,887, filed December 6, 1919, on which Patent 1,600,361 was granted September 21, 1926. The present application thus is a continuation in part of such prior application as to the features common to the two applications.

In my co-pending application, Serial No. 547,907, filed March 29, 1922, on which patent No. 1,748,462 was granted February 25, 1930, I have illustrated a preferred form of shears for severing the glass issuing from the orifice 11. Such shears are shown diagrammatically at 102 and it will be understood that they are operated in timed relation with the plunger so as to sever the suspended gob at a specified time during the operation of the plunger.

The operation of the apparatus is as follows:

Glass from the melting tank is delivered to the chamber 19 of the extension through the passages 21. This chamber is elliptical for the purpose of minimizing the mass of glass subjected to the greatest heat radiation. The flow of glass from the extension through the orifice 16 is controlled by the positioning of the valve 17. The stream of glass so delivered from the extension flows into the rotating receptacle in a continuous stream, consequently the distribution of heat throughout the body of glass within the receptacle is substantially uniform. The rotating plunger 12 is reciprocated at the desired speed and at predetermined intervals for the purpose of accelerating and checking the flow of glass through the orifice 11. The sleeve 13 is adjusted so as to control the flow through the orifice or rather the flow of glass into the well immediately above the orifice. By varying the positioning of the sleeve and the throw of the plunger, the gobs delivered may be varied both in shape and size.

The plunger and the shears are preferably so adjusted that the shears will operate to sever the extruded glass just as the piston reaches the bottom of its stroke. The downward stroke of the plunger may be at a substantially uniform speed, particularly during that period of the stroke, during which the plunger is effective in accelerating the flow through the orifice, consequently the protruding gob is severed at or immediately after maximum acceleration has been obtained. This method of cutting insures the formation of gobs of uniform cross-section, with blunt rounded ends. This is also insured by the fact that the acceleration of flow through the orifice increases as the plunger moves toward the bottom of this well. This offsets the "stringing-out" tendency of the suspended gob occasioned by the weight of mass already extruded. The plunger starts its upward movement just as the cut is completed. This movement not only checks the gravity flow through the orifice 11 but lifts the severed stub off the shears and back toward the orifice.

It will be apparent that the rotatable forehearth or receptacle 10 and the plunger 12, sleeve 13 and associated parts may be mounted independently of the tank so that they may be used in connection with different tanks or even in connection with day tanks.

While I have described and illustrated but one embodiment of my invention, it will be apparent to those skilled in the art that various changes, modifications, additions and omissions may be made in the apparatus illustrated without departing from the spirit and scope of the invention as set forth by the appended claims.

I claim as my invention:

1. In an apparatus for feeding molten glass, a rotatable receptacle provided with an orifice at the center of rotation thereof, a plunger rotatable with said receptacle and axially aligned with said orifice, a sleeve surrounding said plunger projecting into said receptacle and rotatable therewith, means for reciprocating said plunger, means for rotating said receptacle, said plunger and said sleeve, and means for delivering a continuous stream of molten glass to said receptacle during its rotation.

2. In an apparatus for feeding molten glass, a receptacle provided with a flow orifice located in the bottom thereof, a reciprocable plunger projecting into said receptacle from above and movable toward and away from said orifice, a sleeve surrounding said plunger and projecting into said receptacle, and means for rotating said sleeve and said plunger at the same angular velocity.

3. In combination with an apparatus for feeding molten glass, a rotatable receptacle having a flow orifice formed in the bottom thereof and at the center of rotation thereof, a reciprocable plunger projecting into said receptacle and aligned with said orifice, a sleeve surrounding said plunger and projecting into said orifice, and means for rotating said receptacle, said plunger and said sleeve at the same angular velocity.

4. The combination in a melting tank for glass, an extension having a communication with said tank by a passage opening through the bottom of said extension and provided with two glass delivery passages for receiving glass from said tank through said first named passage, and a valve in each of said second named passages.

5. In an apparatus for feeding molten glass, a rotatable receptacle for molten glass having an orifice formed in the bottom thereof, a reciprocable plunger projecting into said receptacle and aligned with said orifice, a sleeve surrounding said plunger and projecting into said receptacle, means for rotating said receptacle and said sleeve, and a connection between said sleeve and said plunger for rotating said plunger.

6. In an apparatus for feeding molten glass, a receptacle for molten glass provided with a flow orifice, a plunger projecting into said receptacle from above and movable toward and away from said orifice in alignment therewith, supporting and actuating mechanisms for said plunger, and a hinged support for said mechanisms.

7. In an apparatus for feeding molten glass, a receptacle for molten glass provided with a flow orifice, a plunger extending downwardly into said receptacle in alignment with said orifice, a sleeve surrounding said plunger, projecting into said receptacle and adjustable towards and away from said orifice, and a hinged support for said sleeve and said plunger.

8. In combination in a glass feeding machine, a receptacle for molten glass, having a flow orifice formed in the bottom thereof, a plunger projecting into said receptacle, and a sleeve projecting into said receptacle and surrounding said plunger, means for reciprocating said plunger, means for rotating said sleeve, and removable and replaceable means for transmitting rotary motion from the sleeve to the plunger when desired.

9. In combination in a glass feeding machine, a receptacle for molten glass having an orifice formed therein, a plunger for controlling the delivery through said orifice, a sleeve axially aligned with said plunger and projecting into proximity with said orifice, and means for rotating said receptacle, said plunger and said sleeve.

10. In a glass feeding machine, a receptacle for molten glass having a flow orifice formed therein, a plunger projecting into said receptacle for controlling the flow through said orifice, a sleeve surrounding said plunger and projecting into said receptacle, means for rotating said sleeve and said plunger, means for reciprocating said plunger during its rotation and means for varying the longitudinal position of said sleeve during its rotation.

11. The combination in a melting tank for glass, of an extension having communication with said tank through the bottom of said extension, and provided with two glass delivery passages, receiving glass from said tank, and separate means for controlling the flow through each of said passages.

12. In combination in a glass feeder, a receptacle for molten glass provided with a flow orifice, a plunger projecting into said receptacle and movable toward and away from said orifice to control the flow therethrough, means for periodically reciprocating said plunger, a sleeve surrounding said plunger and projecting into said receptacle, and a movable support for said sleeve, said plunger and said means.

13. Apparatus for feeding molten glass comprising a discharge receptacle for the glass having a discharge outlet in its bottom, a plunger depending into the glass in the receptacle and reciprocable toward and from the outlet to control discharge of glass through the outlet, a tube surrounding said plunger for regulating the flow of glass to said outlet, and a hinged supporting member extending above said receptacle and carrying both said reciprocable plunger and said flow regulating tube.

14. Apparatus for feeding molten glass comprising a discharge receptacle for the glass having a discharge outlet in its bottom, a plunger depending into the glass in the receptacle and reciprocable toward and from the outlet to control discharge of glass through the outlet, a tube surrounding said plunger for regulating the flow of glass to said outlet, a hinged supporting member extending above said receptacle and carrying both said plunger and said tube, and means also carried by said hinged supporting member for adjusting the positions of said reciprocable plunger and said tube with respect to said outlet.

15. Apparatus for feeding molten glass comprising a discharge receptacle for the glass having a discharge outlet in its bottom, a plunger depending into the glass in the receptacle and reciprocable toward and from the outlet to control discharge of glass through the outlet, a tube surrounding said plunger for regulating the flow of glass to said outlet, a hinged supporting member extending above said receptacle and carrying both said plunger and said tube, and means also carried by said hinged supporting member for independently adjusting the position of said reciprocable plunger and said tube with respect to said outlet.

16. Glass feeding apparatus comprising a discharge receptacle having a discharge outlet in its bottom, a plunger adapted to reciprocate in said receptacle, a tube surrounding said plunger and depending into the glass in the receptacle, means for adjusting said plunger and said tube vertically to clear the receptacle, and a hinged supporting member carrying said plunger and the tube and operable to swing them as a unit laterally of the receptacle when said plunger and said tube have been adjusted vertically to clear said receptacle.

In testimony whereof, I have hereunto subscribed my name this 17th day of October, 1923.

CARL H. RANKIN.